United States Patent [19]

Laumond

[11] Patent Number: 4,816,708
[45] Date of Patent: Mar. 28, 1989

[54] SYNCHRONOUS MACHINE HAVING SUPERCONDUCTIVE STATOR AND ROTOR WINDINGS

[75] Inventor: Yves Laumond, Andelnans, France

[73] Assignee: Alsthom, Paris, France

[21] Appl. No.: 206,390

[22] Filed: Jun. 14, 1988

Related U.S. Application Data

[63] Continuation-in-part of Ser. No. 925,011, Oct. 30, 1986, abandoned.

[30] Foreign Application Priority Data

Oct. 30, 1985 [FR] France .................. 85 16142

[51] Int. Cl.$^4$ ............................................. H02K 9/00
[52] U.S. Cl. ............................................. 310/52; 310/64
[58] Field of Search .................. 310/10, 40 R, 52, 53, 310/58, 59, 61, 54, 64, 162, 165, 254, 261, 184, 198; 62/505, 514 R; 336/DIG. 1

[56] References Cited

U.S. PATENT DOCUMENTS

| | | | |
|---|---|---|---|
| 3,242,418 | 3/1966 | Mela | 310/52 |
| 3,781,578 | 12/1973 | Smith, Jr. | 310/61 |
| 3,816,780 | 6/1974 | Smith, Jr. | 310/52 |
| 3,940,643 | 2/1976 | Sika | 310/52 |
| 4,101,793 | 7/1978 | Berthet | 310/52 |
| 4,176,291 | 11/1979 | Rabinowitz | 310/52 |
| 4,236,091 | 11/1980 | Kutateladze | 310/64 |
| 4,289,985 | 9/1981 | Popov | 310/61 |
| 4,309,632 | 1/1982 | Muller | 310/52 |
| 4,365,479 | 12/1982 | Weghaupt | 310/61 |
| 4,426,592 | 1/1984 | Berzin | 310/52 |
| 4,578,962 | 4/1986 | Dustmann | 62/514 R |

FOREIGN PATENT DOCUMENTS

| | | |
|---|---|---|
| 3207061 | 9/1963 | Fed. Rep. of Germany . |
| 2275053 | 1/1976 | France . |
| 2308234 | 11/1976 | France . |
| 2319233 | 2/1977 | France . |
| 2371806 | 6/1978 | France . |
| 8515416 | 10/1985 | France .................. 310/52 |

*Primary Examiner*—R. Skudy
*Attorney, Agent, or Firm*—Sughrue, Mion, Zinn, Macpeak & Seas

[57] ABSTRACT

A synchronous machine having a rotor fixed to a shaft carried by bearings (23), and having stator and rotor windings (1,2) which are superconducting and which are cooled by very low temperature helium, with each of the windings and the gap (5) therebetween being located in vacuum enclosure, the synchronous machine including the improvement whereby the stator windings are cooled by a bath of liquid helium (12), whereby the rotor windings are cooled by a flow of helium above its critical pressure (14, 15, 16), and whereby said flow of helium above its critical pressure and said liquid helium bath constitute parts of a circuit for cooling helium which is initially under high pressure, which is expanded (8) to a pressure slightly above its critical pressure, which is cooled in a heat exchanger (10) disposed in the liquid helium bath, which is heated by contact with the rotor windings, which is then liquified by further expansion (18), and which finally returned to the liquid helium bath (12).

2 Claims, 1 Drawing Sheet

U.S. Patent    Mar. 28, 1989    4,816,708
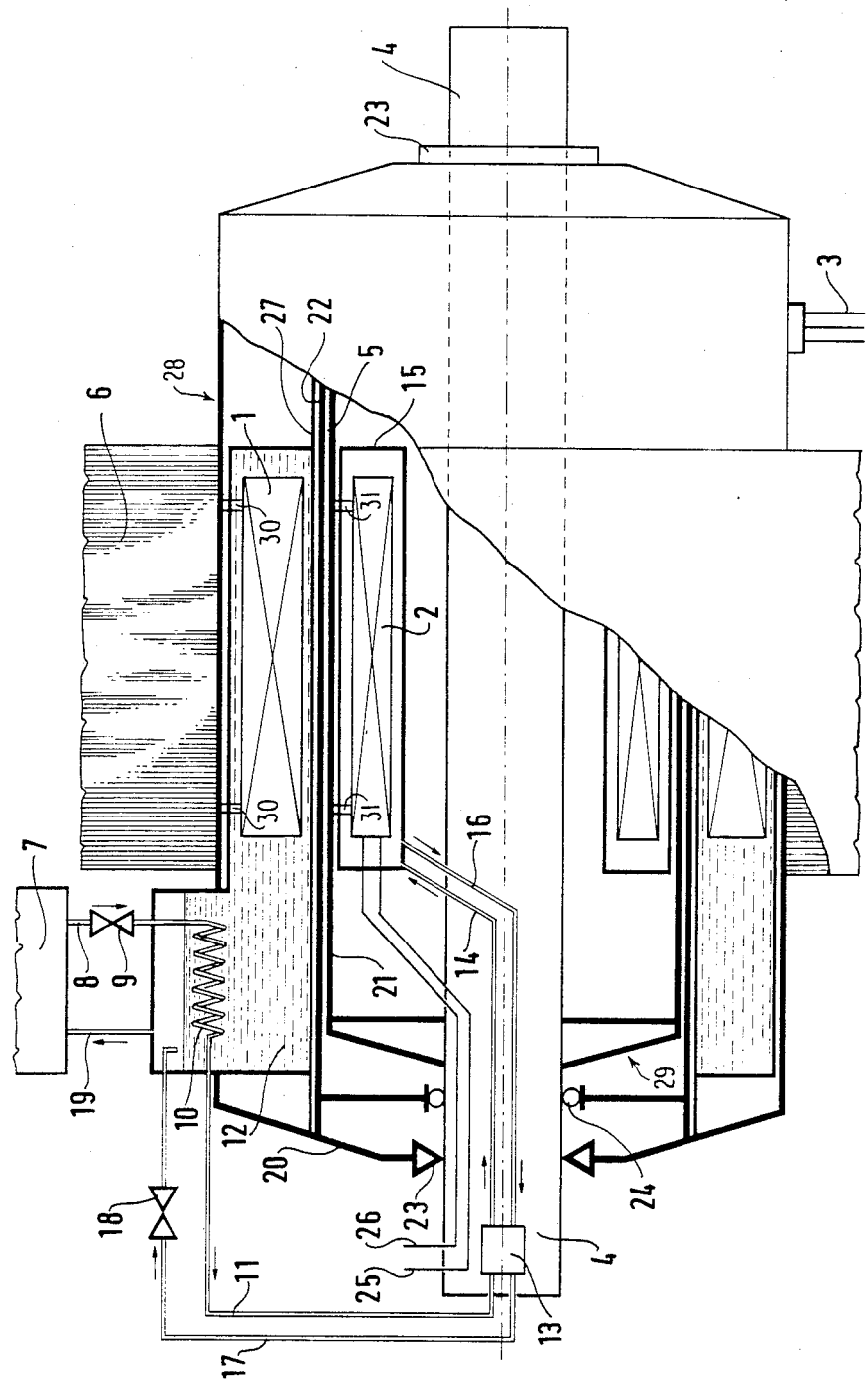

SYNCHRONOUS MACHINE HAVING SUPERCONDUCTIVE STATOR AND ROTOR WINDINGS

This application is a continuation-in-part application of application Ser. No. 925,011, now abandoned, filed Oct. 30, 1986, and identically entitled.

The present invention relates to a synchronous machine whose rotor is mounted on a shaft which is supported in bearings, the machine having superconducting stator and rotor windings which are cooled by very low temperature helium, and both of the windings and the gap therebetween are located in a vacuum enclosure.

BACKGROUND OF THE INVENTION

Published French patent No. 2319233, corresponding to U.S. Pat. No. 4,101,793, in the name of ALSTHOM and Electricite de France describes cooling the superconductor of a cryoalternator by a flow of helium at a pressure higher than its critical pressure and at a temperature close to 4° K., said helium flowing round a circuit from a helium refrigerator, and with the helium being returned to the inlet side of the refrigerator after being partially heated by contact with the rotor.

The above patent does not describe a stator which is also superconducting, but under such circumstances it would be normal to provide a second parallel circuit for cooling the stator.

Such a cooling system is relatively complex and expensive, and requires a system of channels for conveying a flow of helium through the stator windings, which channels are of larger size than those used for the rotor.

The aim of the present invention is to provide a synchronous machine having superconductive stator and rotor windings and including a cooling system which is simpler and cheaper.

SUMMARY OF THE INVENTION

The present invention provides a synchronous machine having a rotor fixed to a shaft carried by bearings, and having stator and rotor windings which are superconducting and which are cooled by very low temperature helium, with each of the windings and the gap therebetween being located in vacuum enclosures, the synchronous machine including the improvement whereby the stator windings are cooled by a bath of liquid helium, whereby the rotor windings are cooled by a flow of helium above its critical pressure, and whereby said flow of helium above its critical pressure and said liquid helium bath constitute parts of a circuit for cooling helium which is initially under high pressure, which is expanded to a pressure slightly above its critical pressure, which is cooled in a heat exchanger disposed in the liquid helium bath, which is heated by contact with the rotor windings, which is then liquefied by further expansion, and which finally returned to the liquid helium bath.

Preferably, the stator and rotor windings are disposed in respective sealed vacuum enclosures, and the gap is connected to a vacuum source and is separated from the bearings by vacuum-proof oil seals. The vacuums may be common, as described in French patent application No. 8515416 filed Oct. 17, 1985.

BRIEF DESCRIPTION OF THE DRAWING

An embodiment of the invention is described by way of example with reference to the sole figure of the accompanying drawing, which is a partially cutaway diagrammatic elevation of a synchronous alternator in accordance with the invention.

MORE DETAILED DESCRIPTION

The alternator includes a stator indicated generally at 28 having a three-phase stator winding of superconducting material 1 fixed thereto at 30, and a rotor indicated generally at 29 having a rotor fixed mounted thereto at 31 a winding 2 which is also superconducting. Three phase conductors 3 leave the stator 28 for connection to a load. The rotor 29 is mounted on a shaft 4, and its periphery as delimited by a cylindrical partition 21 is separated from the stator by a gap 5.

On the other side of the gap 5, the stator is separated from the gap by a cylindrical partition 22. The stator is surrounded by a laminated magnetic circuit 6 for preventing magnetic flux from escaping from the machine.

The winding cooling circuit is as follows. A conventional helium refrigerator 7 compresses helium to a high pressure at a suitably low temperature. This helium is expelled via a duct 8 and passes through an expansion valve 9 where its pressure is dropped to 3 bars absolute, which is slightly higher than its critical pressure. It is supercooled in heat exchange tubes shown diagrammatically at 10 which are immersed in a bath of liquid helium 12 at a pressure very slightly above atmospheric pressure. Cooled in this way to about 4.2° K., it passes along a duct 11 having a rotary bayonet connection disposed in the shaft 4 of the rotor (for example as described in French patent No. 2319233 filed July 22nd, 1975, and in its certificate of addition No. 2371806 in the names of ALSTHOM and Electricite de France) for separating the flow of helium entering the rotor from the flow of heated helium leaving the rotor.

The rotary inlet connection and the rotary outlet connection which is concentric with the inlet connection are represented by a square referenced 13.

From the rotary connection 13, the helium flows along a duct 14 into the vacuum envelope 15 which surrounds the superconducting rotary windings. IT passes through the cooling ducts of the windings and cools them down to about 5° K. thereby heating the supercooled helium before returning via a duct 16 to the second rotary connection surrounding the inlet rotary connection and serving to separate the slightly heated return helium flow (4.5° K.) from the ambient temperature.

After passing through the return rotary connection, the helium passes along a duct 17 at a pressure greater than its critical pressure and then into an expansion valve 18 which reduces its pressure to close to atmospheric pressure, thereby substantially liquefying the helium before returning it to the bath of liquid helium 12. The vapor formed above the bath of liquid helium due to heat exchange with the stator windings and due to gaseous helium at a pressure greater than its critical pressure passing through the heat exchanger 10, is removed via a duct 19 and returned to the compressor of the helium refrigerator.

The stator and rotor assembly is contained in a common envelope 20 carrying bearings 23 for supporting the rotor shaft.

The gap 5 is connected to a vacuum source (not shown) and is separated from the ambient atmosphere by vacuum-resisting oil seals 24. The rotor windings are connected to an electricity feed via conductors 25 and 26. The periphery of the stator adjacent to the gap is provided with a temperature transition and couple transmission tube 27.

What is claimed is:

1. In a synchronous machine having a rotor fixed to a shaft carried by bearings, and having a stator and rotor windings which are superconducting and which are cooled by very low temperature helium, a gap between the stator and rotor windings with each of the windings and the gap therebetween being located in vacuum enclosures, the improvement comprising a bath of liquid helium for cooling the stator windings and means for cooling the rotor windings by a flow of helium above its critical pressure, said rotor windings cooling means comprising a circuit including; cooling helium under high pressure, means for expanding said high pressure helium slightly above its critical pressure, a heat exchanger disposed in the liquid helium bath for supercooling said expanded helium, means for supplying said supercooled expanded helium to said vacuum enclosure within which said rotor windings are located, wherein said expanded, supercooled helium is heated by contact with the rotor windings, means for liquifying said rotor winding heated helium by further expansion, and means for returning said liquified, further expanded helium to the liquid helium bath.

2. A machine according to claim 1, wherein the stator and rotor windings are disposed in respective sealed vacuum enclosures, and wherein the gap is connected to a vacuum source and is separated from the bearings by vacuum-proof oil seals.

* * * * *